(12) United States Patent
Ho

(10) Patent No.: US 8,387,361 B2
(45) Date of Patent: Mar. 5, 2013

(54) HYBRID ROCKET SYSTEM WITH MOVEABLE COMBUSTION CONTROL MEMBER

(75) Inventor: Sook Ying Ho, Golden Grove (AU)

(73) Assignee: Rocketone Aerospace Pty Ltd., Golden Grove, South Australia (AU)

( * ) Notice: Subject to any disclaimer, the term of this patent is extended or adjusted under 35 U.S.C. 154(b) by 1307 days.

(21) Appl. No.: 12/086,191

(22) PCT Filed: Dec. 7, 2006

(86) PCT No.: PCT/AU2006/001861
§ 371 (c)(1),
(2), (4) Date: Jun. 6, 2008

(87) PCT Pub. No.: WO2007/065220
PCT Pub. Date: Jun. 14, 2007

(65) Prior Publication Data
US 2009/0139204 A1    Jun. 4, 2009

(30) Foreign Application Priority Data
Dec. 8, 2005  (AU) ................................. 2005906887

(51) Int. Cl.
*F02K 9/28* (2006.01)
(52) U.S. Cl. ................ 60/251; 60/219; 60/232; 60/234; 60/252; 60/253

(58) Field of Classification Search .................... 60/219, 60/232, 234, 251, 252, 253
See application file for complete search history.

(56) References Cited

U.S. PATENT DOCUMENTS

| | | | | |
|---|---|---|---|---|
| 3,083,527 A | * | 4/1963 | Fox | 60/251 |
| 3,166,898 A | * | 1/1965 | Hoeptner | 60/39.47 |
| 3,270,505 A | * | 9/1966 | Crabill et al. | 60/232 |
| 3,286,471 A | * | 11/1966 | Kaplan | 60/254 |
| 3,325,998 A | * | 6/1967 | Novotny | 60/251 |
| 3,334,489 A | * | 8/1967 | Vilet | 60/251 |
| 3,373,564 A | * | 3/1968 | Maybin | 60/251 |
| 3,575,381 A | * | 4/1971 | Gilmore | 251/359 |
| 3,742,701 A | * | 7/1973 | Feemster et al. | 60/258 |
| 6,125,763 A | * | 10/2000 | Kline et al. | 60/253 |

OTHER PUBLICATIONS

Petroski, Henry, Things Happen, Mechanical Engineering, vol. 134, No. 3, Mar. 2012, pp. 38-41.*

* cited by examiner

*Primary Examiner* — Ehud Gartenberg
*Assistant Examiner* — Lorne Meade
(74) *Attorney, Agent, or Firm* — Nath, Goldberg & Meyer; Jerald L. Meyer; Stanley N. Protigal

(57) ABSTRACT

The present invention describes a hybrid rocket motor that includes a first solid reactant and at least one thrust nozzle and at least one moveable combustion control member within the hybrid rocket motor that restricts the contact of a first fluid reactant in the combustion chamber. In this way, it is then possible to regulate the exposure of the solid reactant to the fluid reactant and thus control thrust.

20 Claims, 3 Drawing Sheets

HYBRID ROCKET SYSTEM WITH MOVEABLE COMBUSTION CONTROL MEMBER

FIELD OF THE INVENTION

The present invention relates to the field of rocket motors and in particular to a thrust modulated hybrid rocket system with hovering/manoeuvring capability.

DESCRIPTION OF THE PRIOR ART

Existing hovering rocket propulsion systems utilise solid rocket technology and a thrust vector control unit to dump excess thrust in order to maintain the required altitude with lateral movement. This invention utilises a hybrid rocket with thrust modulation capability that enables it to conserve thrust when it is not required and hence the potential for large performance gains in terms of increased range and flight time.

Hybrid rockets in which one component of the propellant is stored as a liquid while the other is stored as a solid have the combined performance benefits of liquid rockets and the simplicity of solid rockets. It has the advantages of thrust controllability, low cost and increased safety (because the fuel and oxidiser are stored separately). Hybrid rocket boosters and motors with a pre-combustion chamber for flame stabilisation are described in the U.S. Pat. Nos. 5,715,675 and 6,679,049 respectively and are hereby included by reference. In general, hybrid rocket motors use a liquid or gel oxidiser (such as hydrogen peroxide, nitrous oxide, oxygen) to burn a solid fuel (such as plastics, rubber, paraffin wax), although a liquid fuel and solid oxidiser are sometimes used. The configuration of the solid fuel grain is generally a tubular cylinder, defining the port of the combustion chamber.

In order to improve the mass flow rate to increase thrust, multi-ports fuel grain configurations (such as quadrilateral, "wagon-wheel" designs) are sometimes used to increase the exposed fuel surface area. Such complex solid fuel grain geometries impose high fabrication costs and usually require structural web support to prevent large slivers of the solid fuel from breaking and blocking the nozzle.

OBJECT OF THE INVENTION

For the hovering/manoeuvring rocket application, the motor design is optimised to maintain a specified thrust to vehicle weight ratio for the required burn time within the boundaries of size and weight constraints. To achieve a long burn time within the size and weight constraints and limitations of hybrid rocket design, this invention uses a hybrid rocket with one or more separate fuel grains with or without an extensible/moveable port sleeve and fuel grain separation mechanism.

The separate grains and extensible/moveable port sleeve prevent the burning hot pressurised gas from reaching the other grain(s) and causing their inadvertent ignition. As well as extending the burn time for a fixed motor diameter, the separate fuel grains with extensible/moveable port sleeve concept provides an additional means of thrust management, to supply thrust on demand during flight.

It is an object of the present invention to provide a hybrid rocket with an adaptable thrust control system to maintain an altitude range with lateral movement.

Another objective is to provide a hybrid rocket with a maximised burn time/range for a fixed vehicle mass.

Another objective is to provide an adaptable thrust hovering/manoeuvring rocket system with autonomous (pre-programmed) or real-time flight control capability.

Another objective is to provide a means of adaptable thrust control for hybrid rockets.

Yet a further object of the invention is to provide a means of adaptable thrust control for hybrid rockets by automated control of the oxidiser flow rate from the injection system.

It is an object of the present invention to overcome, or at least substantially ameliorate, the disadvantages and shortcomings of the prior art.

Other objects and advantages of the present invention will become apparent from the following description, taking in connection with the accompanying drawings, wherein, by way of illustration and example, an embodiment of the present invention is disclosed.

DEFINITIONS

The term "moveable combustion control member" as used herein refers to any device or system affecting the combustion flow path and rate of burning, such as regulating the exposure of the solid reactant to the fluid reactant and/or regulating the flow to the combustion chamber to achieve a correct fuel-oxidiser ratio that can readily be burned.

SUMMARY OF THE INVENTION

For the hovering/manoeuvring rocket application, the motor design is optimised to maintain a specified thrust to vehicle weight ratio for the required burn time within the boundaries of size and weight constraints. To achieve a long burn time within the size and weight constraints and limitations of hybrid rocket design, this invention uses a hybrid rocket with one or more separate fuel grains with or without an extensible/moveable port sleeve and fuel grain separation mechanism.

The separate grains and extensible/moveable port sleeve prevent the burning hot pressurised gas from reaching the other grain(s) and causing their inadvertent ignition. As well as extending the burn time for a fixed motor diameter, the separate fuel grains with extensible/moveable port sleeve concept provides an additional means of thrust management, to supply thrust on demand during flight.

According to the present invention, although this should not be seen as limiting the invention in any way, there is provided a hybrid rocket motor including a container having a first fluid and/or gel reactant, a combustion chamber containing at least a first solid reactant therein and having at least one thrust nozzle at one end thereof, a conduit in fluid communication between the container and the combustion chamber, and at least one moveable combustion control member within the hybrid rocket motor that restricts the contact of the first fluid reactant to the solid reactant in the combustion chamber. In this way it is then possible to regulate the exposure of the solid reactant to the fluid reactant. As would be appreciated by a person skilled in the art, ignition is effected by an igniter (may include an ignition fluid source) or using a hypergolic (self igniting) fuel-oxidiser combination.

In preference, the at least one solid reactant has an aperture there though that defines a port and the moveable combustion control member is adapted to be located substantially in the port in a first position.

In preference, the moveable combustion control member can be removed from the port to expose the solid reactant to the first fluid reactant, upon release of the fluid reactant into the combustion chamber.

In preference, the moveable combustion control member is a port sleeve.

In preference the moveable combustion control member is an elongate member that can be moved in and out of the port to regulate exposure of the solid reactant to the first fluid reactant.

In preference, the conduit in fluid communication between the container and the combustion chamber has a removable combustion control member for controlling the delivery of the first fluid reactant to the combustion chamber.

In preference, the combustion chamber further includes a second solid reactant, separated from the first solid reactant by at least one separation member.

In preference, the at least one separation member is in a fixed position.

In preference, the at least one separation member is movable.

In preference, the at least one separation member is part of the movable combustion control member.

As would be appreciated by a person skilled in the art, a plurality of solid reactants could be included so that the length of the burn and thrust level could be customised as required.

In preference, the combustion chamber is defined by the solid reactant.

In preference, the at least one thrust nozzle is movable.

In preference, the first fluid reactant is at least one of a gas, liquid or gel.

In preference, the flow of the first fluid and/or gel reactant is controlled by regulation of the combustion control member and at least one injector orifice providing fluid and/or gel reactant into the combustion chamber.

In preference, the at least one injector orifice is of an adjustable size.

In preference, the regulation of the combustion control member is characterised in the combustion control member includes an injector face and a selector plate.

In preference, the injector face has at least two apertures there through.

In preference, the at least two apertures of the injector face are of different diameters with respect to each other.

In preference, the at least two apertures on the injector face are spaced evenly.

In preference, the selector plate includes at least one aperture there through.

In preference, the selector plate is moveable relative to the injector face so that a desired aperture size may be selected.

In preference, the selector plate can pivot about a central axis of rotation.

In preference, the selector plate has a gear about its periphery.

In preference, the selector plate is operated remotely.

In preference, at least one aperture on the selector plate is aligned with an uppermost portion of an injector face so as to allow fluid connection there through.

In preference, the at least one thrust nozzle is moveable and automated to control the thrust direction.

For some performance requirements, the solid reactant is a multi-port solid reactant.

A further form of the invention resides in a method of propelling a rocket system including providing a hybrid rocket motor including a container having a first fluid and/or gel reactant, a combustion chamber containing at least a first solid reactant therein and having at least one thrust nozzle at one end thereof, a conduit in fluid communication between the container and the combustion chamber, and at least one moveable combustion control member located within the hybrid rocket motor that restricts the contact of the first fluid reactant to the solid reactant in the combustion chamber, injecting the first fluid and/or gel reactant into the combustion chamber to effect combustion of the solid fuel.

In preference, the moveable combustion control member then being moved to affect a control over the exposure of the solid reactant to the first fluid reactant and thus controlling the degree of combustion.

BRIEF DESCRIPTION OF THE DRAWINGS

By way of example, an employment of the invention is described more fully hereinafter with reference to the accompanying drawings, in which.

DETAILED DESCRIPTION OF THE INVENTION

Figure 1:
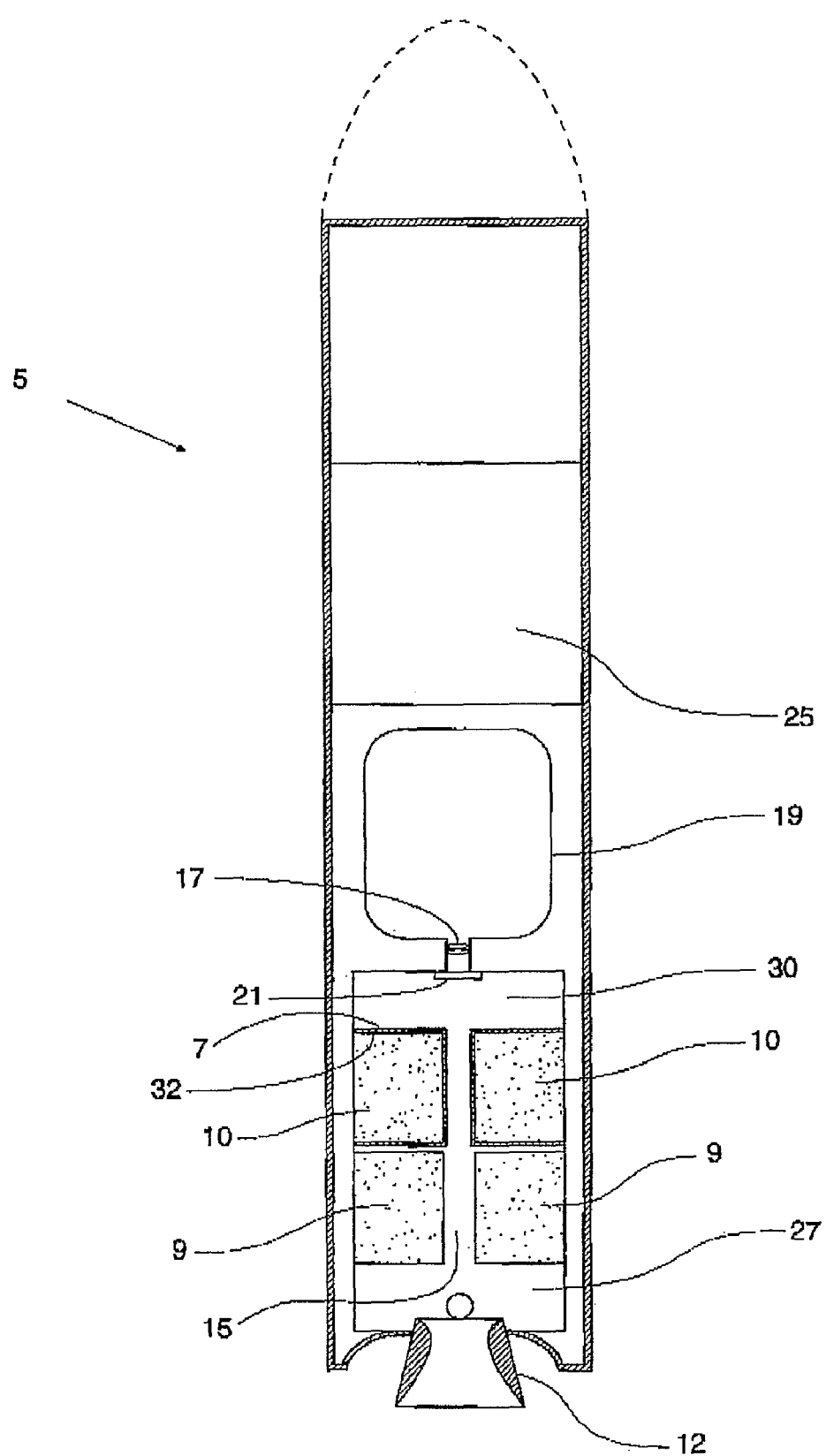
FIG. 1 is a cut away diagram of the hovering/manoeuvring hybrid rocket system with flight/navigation control and housing for the payload.

The hybrid rocket consists of a storage tank containing the pressurised oxidiser (preferably nitrous oxide, liquid oxygen or hydrogen peroxide), a combustion chamber with a solid fuel reactant being a solid fuel grain (preferably a polymeric plastic or rubber, eg. polybutadiene, nylon, polyethylene), an injection system through which the oxidiser is injected into the combustion chamber, a moveable nozzle(s) and an igniter (electronic or pyrotechnic, and may include an ignition fluid source). The oxidiser mass flow rate is controlled by an (automated) combustion control member between the oxidiser tank and injection system and/or (automated) opening and closing of the injector orifice(s).

The main components of the hybrid rocket 5 are the moveable combustion control members 7 and/or 17 being the extensible/moveable port sleeve and separation mechanism in the fuel grain(s), which are the solid reactant, and/or the moveable selector plate and one or more moveable nozzles 12. By moving the moveable combustion control member(s) 7 (also referred to as a port sleeve and/or a grain separation mechanism), which is located substantially in the aperture/port 15 formed by the solid reactant 10 and/or the moveable combustion control member 17, which is located in the proximity of the injector, adaptive thrust control is achieved. Typically the shape of the solid reactants 9 and 10 is a cylinder, with an aperture/port 15 there through, the moveable combustion control member 7 would then be located substantially inside the aperture 15 defined by the solid reactant 10.

As can be seen in FIG. 1, the first solid reactants 9 are exposed and will react with the injected oxidiser from the tank 19. When required the moveable combustion control member (s) 7 can be moved to expose the solid reactant 10 to the injected oxidiser. The solid reactants 9 and 10 may be the same or different according to requirements.

As would be appreciated by those skilled in the art there may be different shapes of movable combustion control members 7 according to the shape of the solid reactant 10, which may have more than one aperture.

The thrust management system also includes an automated combustion control member 17 between the oxidizer tank 19 and injection system 21 and/or adjustable injector orifice size mechanism.

Figure 2:
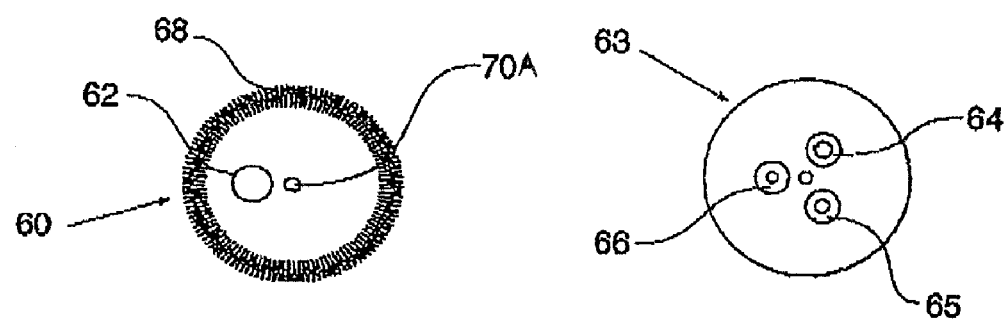
FIG. 2 is a diagram of one form of the combustion control member regulating the flow of the first fluid and/or gel reactant into the combustion chamber.

The automated combustion control member 17 can be of the type shown in FIG. 2, in which there is a selector plate 60 having an aperture 62. Adjacent to the selector plate 60 is an injector face 63 having apertures 64, 65 and 66. The selector plate 60 and injector face 63 both fit within an injector housing assembly (not shown).

The selector plate 60 has a gear 68 located about its periphery such that another gear can engage 68 to turn the selector plate 60 about a pivot 70A. In this manner the aperture 62 of the selector plate 60 can then align with any one of the apertures 64, 65 and 66 of the injector face 63, which is in a fixed position, to provide the desired mass flow rate of oxidizer from the oxidizer tank 19 into the empty space 30, the forward combustion chamber, as determined by the flight/navigation control unit 25.

The number and size of the apertures on both the selector plate 60 and the injector face 63 can be varied according to specific requirements.

As one skilled in the art could appreciate, the way in which the combustion control member operates could be in another way that falls within the scope of the invention, such as by interchanging the injector face and selector plate, such that the selector plate was fixed and the injector plate was capable of moving.

Additionally, the flow of the first reactant through the injector may be controlled by another combustion control member mechanism known to those skilled in this particular art.

Figure 3:
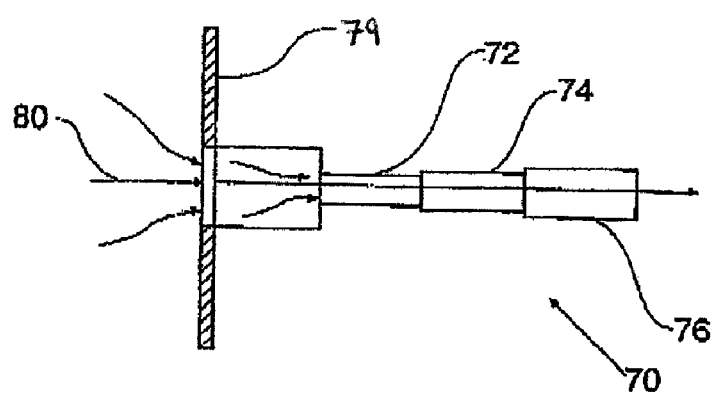
FIG. 3 is a diagram of another form of the combustion control member controlling the exposure of the solid reactant to the fluid reactant.
Figure 4:
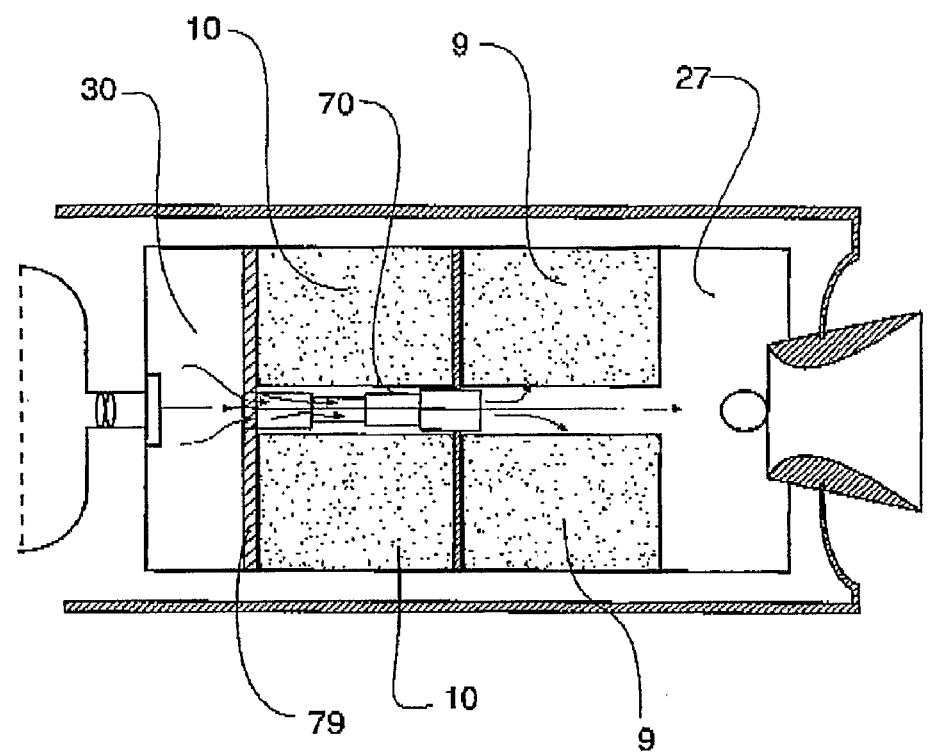
FIG. 4 is a cut away view of the combustion control member of FIG. 3 in a rocket motor directing flow of the oxidizer to a first solid reactant.

The moveable combustion control member may also be in the form of a movable tube 70, as shown in FIG. 3, which comprises a number of moveable segments 72, 74 and 76 that can nest one within the other that fit within the port 15 formed by the solid reactant 10. Such a tube 70 is formed to nest within the shape of the chamber or port 15 such that it could be moved along the length of the chamber 15 so as to regulate the rate of contact or exposure of the first fluid reactant with the solid reactant 10, as the second solid reactant 10 is physically separated from the first solid reactant 9.

By controlling the effective length of the moveable combustion control member 70 can then be controlled so as to regulate the exposure of the second solid reactant 10 to the injected oxidizer.

Figure 5:
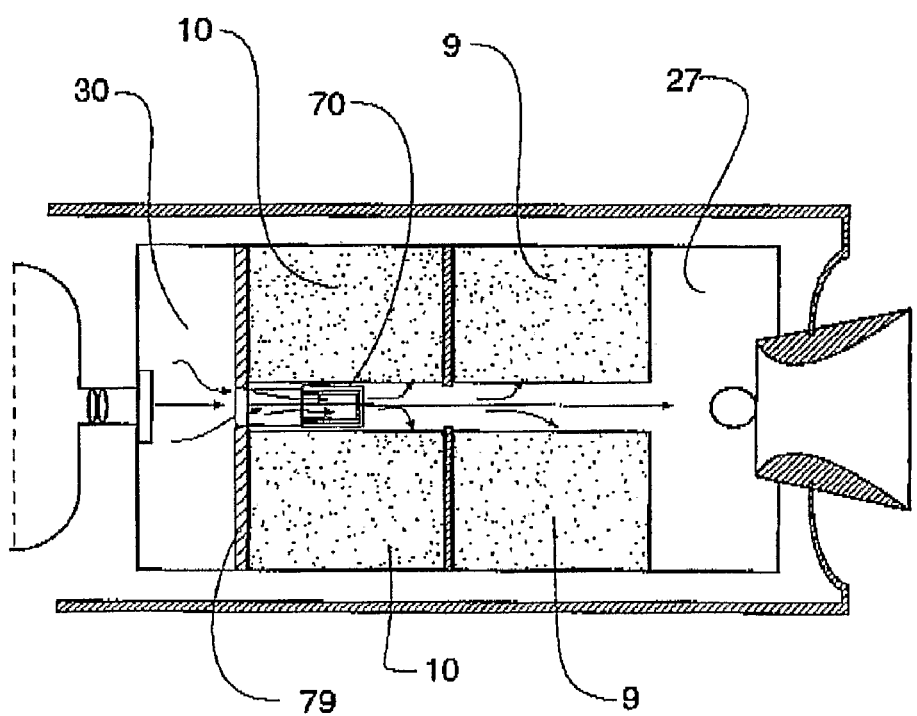
FIG. 5 is the cut away view as FIG. 4 with the combustion control member permitting flow of the oxidiser to a second solid reactant.

Thus, by reducing the overall length of the moveable combustion control member 70, as shown in FIG. 5, the injected oxidizer will be able to react with the second solid reactant 10, thus providing additional thrust.

The moveable combustion control member 70 has a partitioning portion 79 that prohibits the oxidizer in the empty space 30 from reacting with the second solid fuel grain 10, the oxidizer then travels down through the passageway 80 so it can react with the first solid fuel grain 9.

A flight/navigation control unit 25 is also provided for. It consists of the flight computer, sensors (eg., inertial motion unit (IMU), altimeter, gyroscope, accelerometer) and radar receiver/transmitter. The flight control unit 25 can be pre-programmed or real time controlled via the radio frequency (RF) receiver/transmitter. The processor monitors the data from the sensors and, based upon this data, controls the oxidiser-mass flow rate (via a combustion control member 17 controlling the oxidiser flow from the tank 19 and/or size of the injector orifice), position of the extensible/moveable port sleeve 7 and grain separation mechanism, and nozzle 12 flow direction to achieve the desired altitude range and lateral movement.

According to the invention, when the motor design has more than one separate grain 10, an extensible/moveable port sleeve and grain separation mechanism 7 are provided to prevent the burning hot pressurised gas from reaching the other grain(s) and causing their inadvertent ignition. The extensible/moveable port sleeve and separation mechanism 7 are made from a material (and may include thermal barrier coatings) that can withstand the high temperature and pressures from the hot combustion gases.

According to the invention, the empty space 27, downstream of the port before the nozzle(s) 12, and for the empty space 30, between the injector 21 and the top of the fuel grain 32, houses the mounting for the extensible/moveable port sleeve and grain separation mechanism/device. The space 27 (aft combustion chamber) also serves to make the fuel/oxidiser combustion process more efficient by allowing any unburnt vaporised fuel to mix with the oxidiser and burn before exiting the end of the port(s). The empty space 30, the forward combustion chamber, between the injector 21 and top of the fuel grain 32 also serves as housing/mount for the injection system, igniter, sensors, actuators, etc. The forward combustion chamber also serves to increase the combustion efficiency. The igniter can also be placed in the aft combustion chamber 27 but the preferred position is in the forward combustion chamber 30.

Instead of using a separate oxidiser tank 19, the rocket motor tank can be within the motor casing (monotube) and is filled with the oxidiser from the main oxidiser tank just before launch. The fuel grain 10 geometry may have single or multi-ports, depending on the performance requirements and operating conditions.

According to one embodiment of the invention, the size of the orifice(s) of the injection system is adjustable (automated) to control the oxidiser flow rate. By varying the size of the injector orifice(s), it is possible to throttle the oxidiser flow over a wider range without large reductions in injector pressure drop. The injection system design (eg. central orifice injector, swirl injector, showerhead injector) is selected to suit the fuel grain configuration.

According to the invention, a moveable nozzle 12 (including gimbal or hinge, flexible bearing type, flexible sealed rotary joint) is the preferred means of changing the direction of the flight path. However, flexible joint multiple nozzles or other thrust vector control methods could be used to control the flight path.

Flight control algorithms, derived from propulsion system performance, trajectory and kinematics analyses, are used for pre-programmed and/or real-time control of the flight altitude and direction over time. The flight computer (microprocessor) monitors the data from the sensors (such as IMU, altimeter, gyroscope, magnetometer, accelerometer) and, based upon this data, uses the flight control algorithms to achieve the desired control of the oxidiser (or liquid fuel if used) mass flow rate (via a combustion control member from the oxidiser tank and/or size of the injector orifice), position of the extensible/moveable port sleeve and grain separation mechanism, and nozzle flow direction. When possible, commercial-off-the-shelf (COTS) software can be used for the navigation and guidance.

As can now be appreciated, the features herein described, either alone or in combination are capable of providing a great deal of control over the rate of combustion between the oxidiser or liquid fuel (first reactant) and the solid reactants 9 and 10 which enables the provision of varying degrees of thrust to the rocket that have up until now not been achievable.

While the above description refers to a hybrid rocket motor, the present invention is also applicable for multi-pulsed solid rocket motors in that the moveable/extensible port sleeve and grain separation mechanism can be implemented in multi-pulsed solid rocket motors to provide thrust on demand.

The separation of a first solid propellant from a second solid propellant, by a grain separation mechanism allows for combustion of the first solid propellant without the combustion gasses from the first solid propellant initiating combustion of the second solid propellant.

When desired, the movable combustion control member that extends through the ports in the at least second solid propellant is moved to expose the second solid propellant; the combustion gasses from the combustion of the first solid propellant, or an igniter, then initiate the combustion of the second solid propellant. In this way the movable combustion control member can be moved to effect combustion of the solid propellants and thus supply thrust on demand.

Although the invention has been herein shown and described in what is conceived to be the most practical and preferred embodiment, it is recognized that departures can be made within the scope of the invention, which is not to be limited to the details described herein but it is to be accorded the full scope of the appended claims so as to embrace any and all equivalent devices and apparatus.

Various modifications may be made in details of design and construction [and process steps, parameters of operation etc] without departing from the scope and ambit of the invention.

The invention claimed is:

1. A hybrid rocket motor comprising:
    a container having a first fluid and/or gel reactant, a combustion chamber containing at least a first solid reactant therein and having at least one thrust nozzle at one end;
    a conduit in fluid communication between the container and the combustion chamber;
    at least one moveable combustion control member comprising an extensible or movable port sleeve located within the hybrid rocket motor and attached to a partitioning portion that defines an empty space receiving the first fluid reactant, the extensible/movable port sleeve restricting contact of the first fluid reactant to the first solid reactant in the combustion chamber such that it is then possible to regulate the exposure of the first solid reactant to the first fluid reactant;
    actuators controlled by a microprocessor to achieve a desired mass flow rate of the first fluid reactant and an extensible/movable position of the port sleeve;
    the partitioning portion prohibiting the first fluid reactant in the empty space from reacting with the solid reactant adjacent the empty space; and
    a flight computer using flight control algorithms to achieve control of the first fluid reactant and position of the extensible/moveable port sleeve,
    wherein:
        the first solid reactant has an aperture there through that defines a port and the moveable combustion control member is adapted to be located substantially in the port in a first position, and
        the moveable combustion control member can be removed from the port to expose the first solid reactant to the first fluid reactant, upon a release of the first fluid reactant into the combustion chamber.

2. The hybrid rocket motor as in claim 1, wherein the moveable combustion control member is an elongate member that can be moved in and out of the port to regulate exposure of the first solid reactant to the first fluid reactant.

3. The hybrid rocket motor as in claim 1, wherein the conduit in fluid communication between the container and the combustion chamber has a valve located between for controlling the delivery of the first fluid reactant.

4. The hybrid rocket motor as in claim 3, wherein the combustion chamber further includes
    at least a second solid reactant, separated from the first solid reactant by at least one separation member,
    and wherein the moveable combustion control member, when restricting contact of the first fluid reactant to the second solid reactant in the combustion chamber, allows contact of the first fluid reactant with the first solid reactant.

5. The hybrid rocket motor of claim 4, wherein the at least one separation member is in a fixed position.

6. The hybrid rocket motor as in claim 4, wherein the combustion chamber is defined by the solid reactant.

7. The hybrid rocket motor as in claim 4, wherein the at least one thrust nozzle is moveable.

8. The hybrid rocket motor as in claim 3, wherein flow of the first fluid and/or gel reactant is controlled by the moveable combustion control member; and
    an automated combustion control member located between the container and the empty space which controls the flow of the first fluid and/or gel reactant into the empty space.

9. The hybrid rocket motor as in claim 8, wherein the automated combustion control member includes an injector face and a selector plate.

10. The hybrid rocket motor as in claim 9, wherein the injector face has at least two apertures there through.

11. The hybrid rocket motor as in claim 10, wherein the at least two apertures of the injector face are of different diameters with respect to each other.

12. The hybrid rocket motor as in claim 11, wherein the at least two apertures on the injector face are spaced evenly.

13. The hybrid rocket motor as in claim 12, wherein the selector plate includes at least one aperture there through.

14. The hybrid rocket motor as in claim 13, wherein the at least one thrust nozzle is moveable and automated to control the thrust direction.

15. The hybrid rocket motor as in claim 14, wherein the selector plate is moveable relative to the injector face so that a desired aperture size may be selected by aligning the aperture in the selector plate with one of the apertures in the injector face.

16. The hybrid rocket motor as in claim 15, wherein the selector plate can pivot about a central axis of rotation.

17. The hybrid rocket motor as in claim 16, wherein the selector plate has a gear about its periphery.

18. The hybrid rocket motor as in claim 17, wherein the selector plate is operated remotely.

19. The hybrid rocket motor as in claim 18, wherein at least one aperture on the selector plate is aligned with an uppermost portion of an injector face so as to allow fluid connection there through.

20. A hybrid rocket motor comprising:
    a container having a first fluid and/or gel reactant, a combustion chamber containing at least a first solid reactant therein and having at least one thrust nozzle at one end;
    a conduit in fluid communication between the container and the combustion chamber;
    at least one moveable combustion control member comprising a port sleeve located within the hybrid rocket motor, the movable combustion control member restricting contact of the first fluid reactant to the first solid reactant in the combustion chamber such that it is then possible to regulate the exposure of the first solid reactant to the first fluid reactant;

the movable combustion member further comprising a partitioning portion that defines an empty space receiving the first fluid reactant, the partition portion prohibiting the first fluid reactant in the empty space from reacting with the solid reactant adjacent the empty space; and a flight computer using flight control algorithms to achieve control of the first fluid reactant and position of the extensible/moveable port sleeve, wherein:

the first solid reactant has an aperture there through that defines a port and the moveable combustion control member is adapted to be located substantially in the port in a first position, and the moveable combustion control member can be removed from the port to expose the first solid reactant to the first fluid reactant, upon a release of the first fluid reactant into the combustion chamber to permit consumption of the first solid reactant without consuming the partitioning portion.

* * * * *